United States Patent [19]

Fukumura et al.

[11] Patent Number: 4,628,326
[45] Date of Patent: Dec. 9, 1986

[54] APPARATUS FOR PREVENTING DRYING-UP OF DRAWING NEEDLE PENS

[75] Inventors: Sadaaki Fukumura, Tokyo; Takeji Hashimoto; Hirofumi Tano, both of Kyoto, all of Japan

[73] Assignees: Iwatsu Electric Co., Ltd., Tokyo; Dainippon Screen Mfg. Co., Ltd., Kyoto, both of Japan

[21] Appl. No.: 693,933

[22] Filed: Jan. 23, 1985

[30] Foreign Application Priority Data

Feb. 14, 1984 [JP] Japan .............................. 59-19700[U]

[51] Int. Cl.⁴ ........................................... G01D 15/16
[52] U.S. Cl. ...................................... 346/29; 33/18.1; 346/140 R
[58] Field of Search ................. 346/139 R, 140 R, 29; 33/18 R

[56] References Cited

U.S. PATENT DOCUMENTS

| | | | |
|---|---|---|---|
| 1,967,900 | 7/1934 | Perry | 346/49 |
| 3,039,438 | 6/1962 | Brown | 346/140 R |
| 4,097,874 | 6/1978 | Anderka | 346/140 |
| 4,135,245 | 1/1979 | Kemplin | 346/139 R X |
| 4,543,589 | 9/1985 | Terasawa | 346/140 |

*Primary Examiner*—Joseph W. Hartary
*Attorney, Agent, or Firm*—Martin A. Farber

[57] ABSTRACT

A plotter for causing a pen carriage to pick up a drawing needle pen from a pen socket so as to perform drawing, comprises: a support plate located immediately under the pen socket and biased toward a pen tip; and an anti-dry pad formed on an upper surface of the support plate, having elastic and hermetic sealing properties, the pen tip being inserted into the pad.

8 Claims, 4 Drawing Figures

APPARATUS FOR PREVENTING DRYING-UP OF DRAWING NEEDLE PENS

BACKGROUND OF THE INVENTION

The present invention relates to an improvement of such a plotter using various kinds of pens and, more particularly, to an anti-dry structure of a drawing needle pen.

In a conventional plotter used in computer graphics or the like, various kinds of felt pens, ball-point pens, or drawing needle pens are prepared in a pen socket, and one of the pens is selected and held by a pen carriage so as to perform drafting. Especially, in such a plotter as is used for framing in newspapers, magazines or the like, a drawing needle pen must be able to draw very thin lines of 0.1 to 0.3 mm in width.

When the drawing needle pen is exposed to air for a few minutes, even though delayed-drying ink is used, moisture evaporates from the ink through the pen tip and the ink solidifies. Due to this the pen becomes scratchy and the line thickness becomes irregular, and in the worst case, a line cannot be drawn at all. For this reason, conventionally, the tip of the drawing needle pen stored in a pen socket is inserted in a water-containing pot so as to prevent the moisture evaporation, or the drawing needle pen held by a pen carriage is subjected to preliminary drawing. In this manner, the drawing capability of a pen is visually ascertained, and then actual drawing is started. However, when the former, i.e., the conventional technique using the water-containing pot, is employed, a water droplet adheres to the pen tip and the vicinity thereto, where the drawn ink is diluted. Therefore, it is impossible to use the drawing needle pen immediately after the pen is taken from the water-containing pot. On the other hand, when the latter, i.e., the conventional technique of preliminary drawing, is employed, solidified ink at the pen tip is not always removed. Therefore, actual drawing is often delayed until the pen tip is cleaned.

SUMMARY OF THE INVENTION

It is, therefore, an object of the present invention to provide a plotter wherein the tip of a pen stored in a pen socket will not become dried, and a drawing needle pen can be utilized for actual drawing immediately after the pen is held by a pen carriage.

According to an advantageous feature of the present invention, a plotter comprises a pen carriage which holds a pen to be used; a pen socket in which a pen or pens not to be used is or are stored; and an anti-dry pad in which the pen tip or tips is or are inserted while the pen or pens is or are stored in the pen socket. The pen carriage is connected to motors and is carried so as to be movable in longitudinal and lateral directions in relation to a drawing plane of the plotter, where the motors are controlled by a computer so as to move the carriage as desired in the longitudinal and lateral directions in relation to the drawing plane of the plotter. The pen socket comprises a fork or forks adaptable to hold a pen or pens not to be used. The pen carriage includes a finger adaptable to receive a pen held in the pen socket, thus a pen stored in the pen socket is transferred from the socket to the carriage.

The anti-dry pad comprises an elastic material of closed-cells, e.g., neoprene sponge, which is adaptable to prevent the tip of the pen stored in the socket from drying while the pen is not used for drawing. The pen tip has elastic and hermetic properties so as to be easily inserted in and into the pad. The pad is preferably supported by a support plate, which is urged toward the pen tip by a spring. A cam follower is integrally mounted on the support plate so as to suitably engage with a cam mounted on the front of the carriage, by which the pad supported on the support plate is diverted from the pen tip as the carriage proceeds to the pen when the pen is loaded in the pen socket, and conversely.

The above and further objects and novel features of the invention will more fully apparent from the following detailed description when the same is read in connection with the accompanying drawings. It is to be expressly understood, however, that the drawings are for purpose of illustration only and is not intended as a definition of the limits of the invention.

DESCRIPTION OF THE PREFERRED EMBODIMENT

Figure 1:
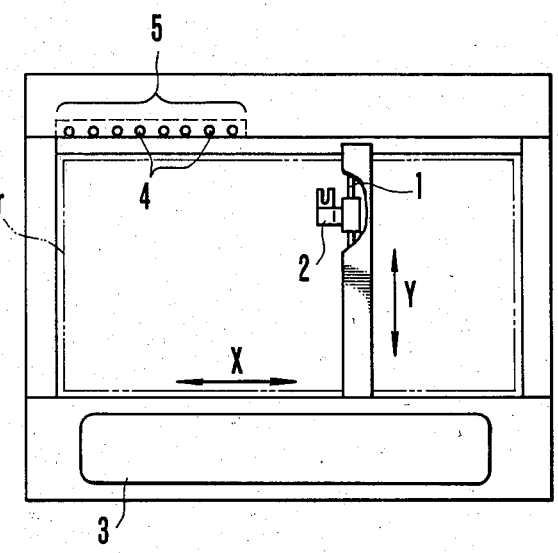
FIG. 1 is a plan view showing an embodiment of the present invention.
Figure 3:
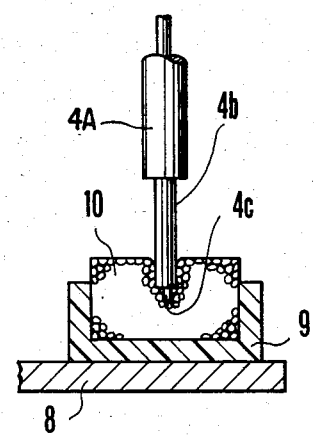
FIG. 3 is an enlarged view of a part of the structure shown in FIG. 2(a).

Referring to FIG. 1, there is provided a guide rod 1 fed by a steel belt (not shown), in directions indicated by arrow X, which is driven by a servo-motor (not shown). A pen carriage 2 is slidably supported on the guide rod 1 and is to be fed in directions indicated by arrow Y, by means of a wire which is driven by another servo-motor (not shown). The X-Y coordinates of the pen carriage 2 are designated by address signals from, e.g., a computer (not shown), thereby the pen carriage 2 is automatically moved as desired in accordance with the address signals. Detailed explanation on the above mentioned construction and operation is not necessary, since they are not the subject matter of the present invention. An image is drawn within an effective area γ indicated by an imaginary line. A pen socket 5 is arranged beside the effective area γ of the upper surface 3 of the plotter so as to store a plurality of recording pens 4. A predetermined recording pen 4 is picked up and held by the pen carriage 2 to draw desired markings in accordance with instructions from the computer.

Figure 2A:
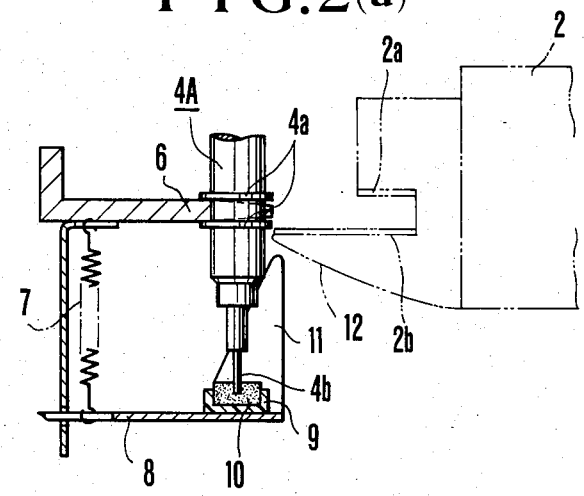
FIG. 2(a) is a sectional view of a pen socket of a drawing needle pen 4A when the pen is completely stored in the pen socket.
Figure 2B:
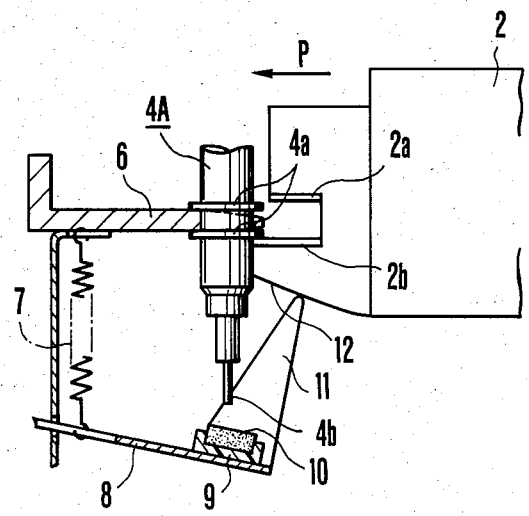
FIG. 2(b) is a sectional view of the pen socket when the pen is about to be taken out from the pen socket.

FIGS. 2(a) and 2(b) are sectional views showing the pen socket 5 for holding a drawing needle pen 4A. The pen socket 5 has a fork 6 to be engaged with collars 4a of the drawing needle pen 4A. The pen carriage 2 has a pair of fingers 2a and 2b for vertically clamping the upper and lower collars 4a. A support plate 8 is disposed immediately below the fork 6 and is biased upward by a tension spring 7. An anti-dry pad 10 is mounted on the upper surface of the support plate 8 through a circular cup 9. A pen tip 4b of the drawing needle pen 4A held in the pen socket 5 is inserted into the pad 10. The pad 10 comprises neoprene sponge of closed-cells. When the pen tip 4b of the drawing needle pen 4A is inserted into the pad 10, the pen tip is brought into close contact with the sponge so as to seal a top end 4c of the pen tip 4b from the external atmosphere. However, material to be used for the anti-dry pad 10 is not limited to neoprene sponge of closed-cells, but any material is applicable which has high elasticity and can be brought into close contact with the pen tip 4b so as to provide a sealed condition thereto.

The pad 10 is withdrawable from the movement locus of the pen tip 4b when the drawing needle pen 4A is loaded on or unloaded from the fork 6. For this purpose, a cam follower 11 is formed integrally at the front end of the support plate 8. As shown in FIG. 2B, the cam follower 11 is engageable with a cam 12 formed at the opposite end face of the pen carriage 2. When the pen carriage 2 is moved in a direction indicated by arrow P, the cam follower 11 is urged downward along the inclined surface of the cam 12 of the pen carriage 2, so that the pad 10 is moved downwardly detaching from the pen tip 4b of the drawing needle pen 4A. Upon further movement of the pen carriage 2 in the direction of arrow P, a drawing needle pen 4A can be transferred from the fork 6 to the pen carriage 2.

When the drawing needle pen 4A is stored in the socket 5 as illustrated, the pen carriage 2 is moved in a direction opposite to the arrow P, and the support plate 8 is moved upwardly by the biasing force of the tension spring 7, thus the pen tip 4b of the drawing needle pen 4A is inserted into the pad 10.

According to the embodiment described above, since the pen tip 4b of the drawing needle pen 4A stored in the pen socket 5 is kept inserted in the pad 10, the ink at the pen tip 4b will not become solidified. In this mode, the pad 10 is in close contact with the pen tip 4b, so that moisture evaporation from the end of the pen tip 4b will not occur. Therefore, the drawing needle pen 4A picked up by the pen carriage 2 can be immediately used for drawing. The advantages of the present invention are observed when the pad 10 comprises a closed-cell elastic material. Since moisture evaporated from the pen tip 4b runs immediately up to a saturated vapor pressure state, further evaporation from the pen tip 4b will not occur.

As has been made apparent from the above description, the pen tip of the drawing needle pen stored in the pen socket will not become dry. Even if a very thin drawing needle pen is used, immediate drawing with the pen can be performed by the carriage.

What is claimed is:

1. An apparatus for plotting markings with drawing needle pens when used and for preventing drying-up of the pens containing ink and pen tips thereof prior to use, comprising
    a plotting plane on which desired markings are drawn by the pens;
    a pen carriage for holding a selected drawing needle pen to be used, said carriage being connected with at least one motor and being movable longitudinally and laterally relative to said plotting plane;
    storing means for storing at least one of the drawing needle pens, said storing means including a supporting member for holding the pens prior to use; and
    anti-dry means for preventing the pen tips of the drawing needle pens containing ink and stored in said storing means from drying-up, said anti-dry means being disposed in said storing means and comprising a pad having elastic and hermetic properties made of non-porous closed-cells, into which pad said pen tips are insertable and hermetically sealed by the pad for preventing drying-up of ink in the pens and tips.

2. The apparatus as set forth in claim 1, wherein said pen carriage has spaced apart fingers,
    said supporting member is a fork,
    each of said pens includes collars between which said fork and said fingers engage respectively.

3. The apparatus as set forth in claim 1, wherein each of said pen tips includes a top end which is sealed in said pad when said pen tip is inserted into said pad.

4. The apparatus as set forth in claim 1, wherein said pad is made of neoprene material.

5. The apparatus as set forth in claim 1, wherein said pad has a flat upper surface facing and perpendicular to said pen tips when said pen tips are inserted in said pad.

6. An apparatus according to claim 1, further comprising a support plate on which said anti-dry means is mounted, and a spring connected to said support plate such that said anti-dry means is constantly urged toward the pen tip.

7. An apparatus according to claim 6, further comprising a cam member mounted on the front end of said pen carriage; and a cam follower integrally mounted on said support plate, said cam follower being movable diverting from the pen tip against said spring comprising a tension spring in cooperation with said cam member, whereby said anti-dry means is diverted from the pen tip when a pen is loaded to or unloaded from said storing means.

8. The apparatus as set forth in claim 7, further comprising
    a circular cup is mounted on said support plate adjacent said cam follower,
    said pad is mounted in said circular cup.

* * * * *